United States Patent
Kim

(10) Patent No.: US 10,728,483 B2
(45) Date of Patent: *Jul. 28, 2020

(54) COMPARATOR WITH CORRELATED DOUBLE SAMPLING SCHEME, CMOS IMAGE SENSOR INCLUDING THE SAME, AND OPERATING METHOD THEREOF

(71) Applicant: SK hynix Inc., Gyeonggi-do (KR)

(72) Inventor: Tae-Gyu Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 108 days.

This patent is subject to a terminal disclaimer.

(21) Appl. No.: 15/441,399

(22) Filed: Feb. 24, 2017

(65) Prior Publication Data

US 2017/0318247 A1 Nov. 2, 2017

(30) Foreign Application Priority Data

May 2, 2016 (KR) .................. 10-2016-0054048

(51) Int. Cl.
  *H04N 5/335* (2011.01)
  *H04N 5/378* (2011.01)
  *H04N 5/369* (2011.01)
(52) U.S. Cl.
  CPC ........... *H04N 5/378* (2013.01); *H04N 5/3698* (2013.01)
(58) Field of Classification Search
  CPC .............................. H04N 5/378; H04N 5/3698

USPC .......................................................... 348/308
See application file for complete search history.

(56) References Cited

U.S. PATENT DOCUMENTS

| 7,741,988 | B2 | 6/2010 | Hattori | |
| 2004/0160794 | A1* | 8/2004 | Lin | H02M 7/523 363/98 |
| 2009/0160984 | A1* | 6/2009 | Lee | H03M 1/1019 348/294 |
| 2012/0038809 | A1* | 2/2012 | Lee | H04N 5/3575 348/308 |
| 2012/0049042 | A1* | 3/2012 | Lim | H04N 5/3575 250/208.1 |

FOREIGN PATENT DOCUMENTS

KR        101460049        11/2014

* cited by examiner

*Primary Examiner* — Usman A Khan
(74) *Attorney, Agent, or Firm* — IP & T Group LLP

(57) ABSTRACT

A comparison device includes; a comparison block suitable for comparing a pixel signal with a reference voltage including a ramp-up signal and a ramp-down signal; a correlated double sampling (CDS) block suitable for performing a correlated double sampling operation on the pixel signal; a first switch suitable for selectively inputting the ramp-up signal as the reference voltage based on a first switch control signal; a second switch suitable for selectively inputting the ramp-down signal as the reference voltage based on a second switch control signal; and a feedback control unit suitable for generating the first and second switch control signals based on a result of the comparison during an initialization operation.

21 Claims, 5 Drawing Sheets

COMPARATOR WITH CORRELATED DOUBLE SAMPLING SCHEME, CMOS IMAGE SENSOR INCLUDING THE SAME, AND OPERATING METHOD THEREOF

CROSS-REFERENCE TO RELATED APPLICATION

This application claims priority under 35 U.S.C. § 119 to Korean Patent Application No. 10-2016-0054048 filed on May 2, 2016 in the Korean Intellectual Property Office, the disclosure of which is incorporated herein by reference in its entirety.

TECHNICAL FIELD

Exemplary embodiments of the present disclosure relate to a high-speed and low-power comparator, an image sensor including the same, and an operating method thereof.

DESCRIPTION OF THE RELATED ART

Image sensing devices capture images using photosensitive properties of semiconductors. Image sensing devices are generally classified into charge-coupled device (CCD) image sensors and complementary metal-oxide semiconductor (CMOS) image sensors. CMOS image sensors allow both analog and digital control circuits to be integrated in a single integrated circuit (IC), making CMOS image sensors the most widely used type of image sensor.

Generally, CMOS image sensors have advantages of low power consumption, low cost and a small size compared to those of other competitive products. Hence, as the image quality of CMOS image sensors, which has been relatively insufficient compared to that of competitive products, is improving, the application field thereof is widening including video applications that require both high resolution and a high-speed frame rate.

Heretofore, in order to realize improved CMOS image sensors which combine higher-speed frame rates with higher resolutions, efforts have focused on improving the analog-to-digital conversion (ADC) characteristics of the CMOS image sensors.

However, employing a conventional analog-to-digital conversion method, it has been difficult to reduce the time required for converting the data, which means that improvements up to now have been made at the cost of increasing power consumption requirements of the CMOS image sensor.

SUMMARY

Various embodiments are directed to a comparator with a correlated double sampling (CDS) block which combines a higher data conversion speed and reduced power consumption, an image sensor including the same, and an operating method thereof.

In an embodiment, a comparator for an image sensor, the comparator may comprise: a comparison block suitable for comparing a pixel signal with a reference voltage including a ramp-up signal and a ramp-down signal; a correlated double sampling (CDS) block suitable for performing a correlated double sampling operation on the pixel signal; a first switch suitable for selectively inputting the ramp-up signal as the reference voltage based on a first switch control signal; a second switch suitable for selectively inputting the ramp-down signal as the reference voltage based on a second switch control signal; and a feedback control unit suitable for generating the first and second switch control signals based on a result of the comparison during an initialization operation.

The feedback control unit may activate the first switch control signal when a voltage level of the pixel signal may be greater than the reference voltage until a predetermined time passes after the initialization operation. The feedback control unit may activate the second switch control signal when a voltage level of the pixel signal may be equal to or less than the reference voltage until a predetermined time passes after starting the initialization operation. The comparison block may include an operational amplifier and a feedback switch. The comparison block further may include a buffer. The CDS block may include a capacitor.

In an embodiment, an operating method of an image sensor, the operating method may comprise: comparing a pixel signal to a ramp signal during an initialization operation; generating a control signal for selecting a ramp-up signal or a ramp-down signal based on a result of the comparison; and selecting the ramp-up signal or the ramp-down signal as the ramp signal based on the control signal to perform a comparison operation using the selected ramp signal.

The ramp-up signal may be selected as the ramp signal during the comparison operation when a voltage level of the pixel signal may be greater than a voltage level the ramp signal during the initialization operation, and the ramp-down signal may be selected as the ramp signal during the comparison operation when a voltage level of the pixel signal may be equal to or less than the reference voltage during the initialization operation.

In an embodiment, an image sensor may comprise: a pixel array suitable for outputting a pixel signal corresponding to incident light; a ramp signal generation circuit suitable for generating a ramp-up signal and a ramp-down signal; a comparison circuit suitable for selecting the ramp-up signal or the ramp-down signal based on a value of the pixel signal during an initialization operation, comparing a value of the pixel signal with a value of the selected ramp signal and generating an output comparison signal; a counting circuit suitable for performing a counting operation on the output comparison signal; a memory circuit suitable for storing data representative of the counting information outputted from the counting circuit; a column readout circuit suitable for outputting the data of the memory circuit; and a control circuit suitable for controlling operations of pixel array, the ramp signal generation circuit, the comparison circuit, the counting circuit, the memory circuit and the column readout circuit.

In an embodiment, a comparator provided in each column of the comparison circuit, may comprise: a comparison block suitable for comparing a pixel signal with a ramp signal; a correlated double sampling (CDS) block suitable for performing a correlated double sampling operation on the pixel signal; a first switch suitable for selectively inputting a ramp-up signal as the ramp signal based on a first switch control signal; a second switch suitable for selectively inputting a ramp-down signal as the ramp signal based on a second switch control signal; and a feedback control unit suitable for generating the first and second switch control signals based on a result of the comparison during the initialization operation.

The comparison block performs a comparison operation using the inputted ramp signal. The feedback control unit may activate the first switch control signal when a voltage level of the pixel signal may be greater than a voltage level of the ramp signal until a predetermined time passes after the initialization operation. The feedback control unit may activate the second switch control signal when a voltage level of the pixel signal may be equal to or less than a voltage level of the ramp signal until a predetermined time passes after starting of the initialization operation. The comparison block may include an operational amplifier and a feedback switch. The comparison block further may include a buffer. The CDS block may include a capacitor. The image sensor may be a CMOS image sensor. The image sensor may further may comprise a row circuit.

BRIEF DESCRIPTION OF THE DRAWINGS

The above and other features and advantages of the present invention will become more apparent to those skilled in the art to which the present invention belongs by describing in detail various embodiments thereof with reference to the attached drawings in which.

DETAILED DESCRIPTION

Figure 1A:
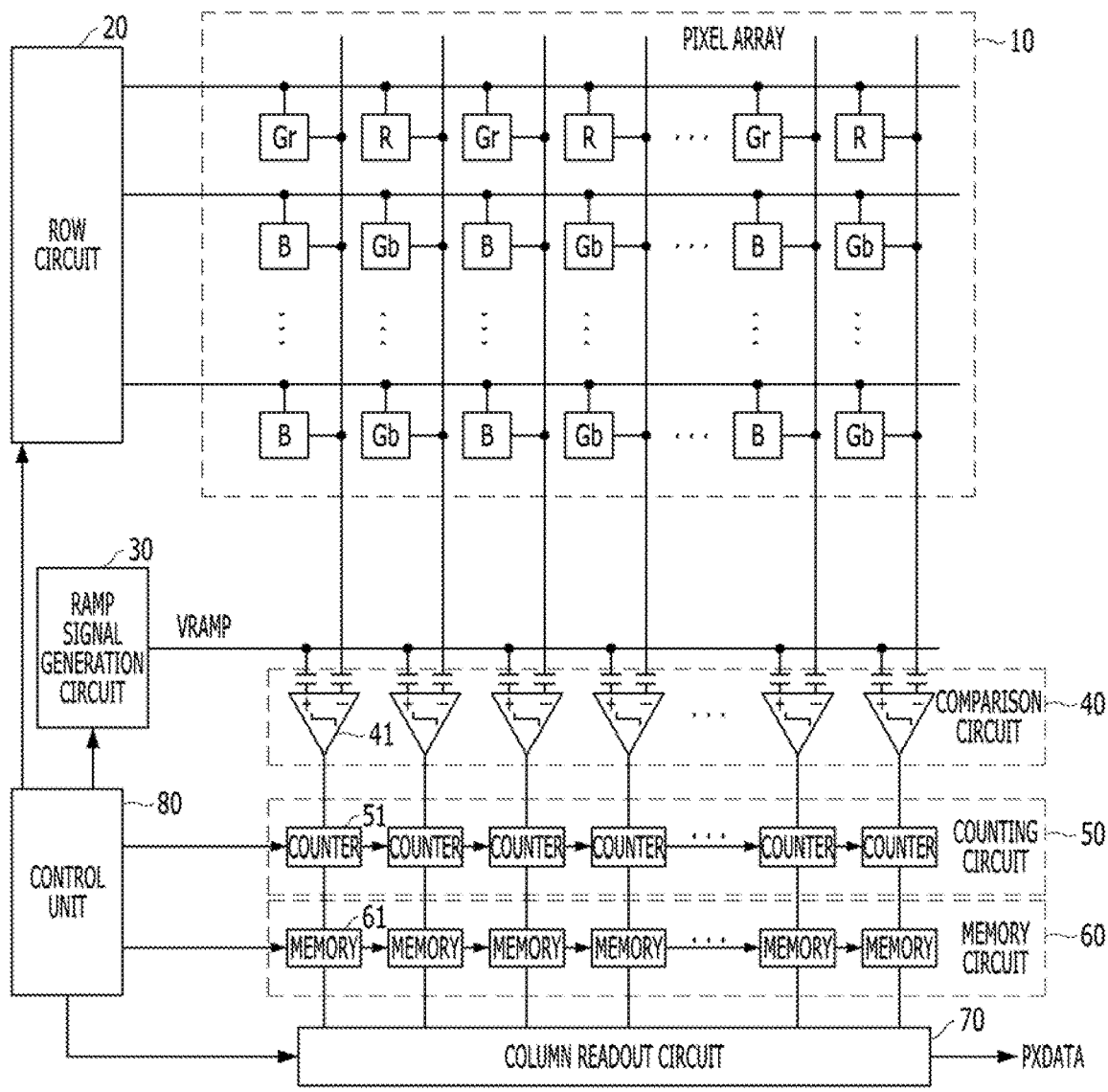
FIG. 1A is a diagram illustrating a CMOS image sensor.

Various embodiments will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

The drawings are not necessarily to scale and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

Hereinafter, the various embodiments of the present invention will be described in detail with reference to the attached drawings.

FIG. 1A is a diagram illustrating a CMOS image sensor. FIG. 1A shows a CMOS image sensor having a column parallel structure embodied using a general single slope analog-to-digital converter. Referring to FIG. 1A, the CMOS image sensor includes a pixel array 10, a row circuit 20, a ramp signal generation circuit 30, a comparison circuit 40, a counting circuit 50, a memory circuit 60, a column readout circuit 70, and a control circuit 80.

Figure 1B:
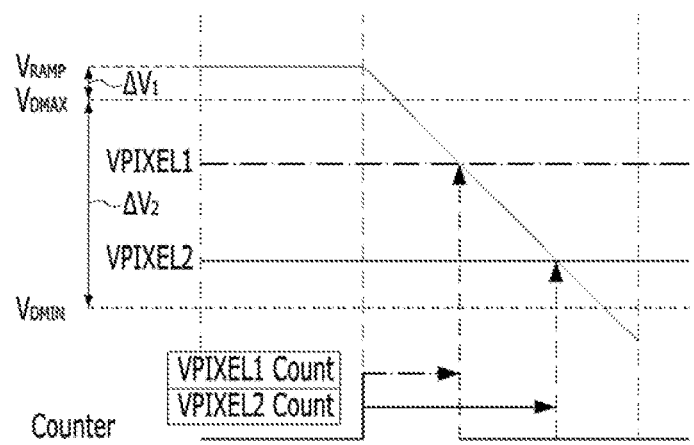
FIG. 1B is a timing diagram describing an analog-digital conversion operation of the CMOS image sensor shown in FIG. 1A.

The pixel array 10 outputs pixel signals (e.g., VPIXEL1 and VPIXEL2 of FIG. 1B) corresponding to incident light. The row circuit 20 selects pixels in the pixel array 10 by respective row lines, and controls the operations of the selected pixels. For example, the row circuit 20 includes a row decoder and a row driver. The ramp signal generation circuit 30 generates a ramp signal VRAMP. The comparison circuit 40 compares a value of the ramp signal applied from the ramp signal generation circuit 30 with a value of each pixel signal outputted from the pixel array 10. The counting circuit 50 counts a clock that is provided from the control circuit 80 according to each output signal of the comparison circuit 40. The memory circuit 60 stores counting information outputted from the counting circuit 50. The column readout circuit 70 successively outputs data of the memory circuit 60 as pixel data PXDATA. The control circuit 80 controls the operations of the row circuit 20, the ramp signal generation circuit 30, the counting circuit 50, the memory circuit 60, and the column readout circuit 70. For example, the control circuit 80 includes a timing generator.

The CMOS image sensor compares pixel signals (i.e., pixel output voltages) generated before and after an optical signal is incident thereon, with each other in order to remove an offset value of a pixel itself, and thus measures only a pixel signal substantially resulting from the incident light. Such an operation is referred to as Correlated Double Sampling (CDS). The CDS operation is performed by the comparison circuit 40.

The comparison circuit 40 includes a plurality of comparators 41, the counting circuit 50 includes a plurality of counters 51, and the memory circuit 60 includes a plurality of memories 61. The comparators, the counters, and the memories are provided in columns corresponding to the columns of the pixel array so that for each column corresponds a comparator 41, a counter 51 and a memory 61. Hence, a pixel signal generated by the pixel array is transmitted to a comparator, counter and memory of a respective column in the recited order.

Hereinafter, the operation of one comparator, one counter, and one memory will be described by way of example.

A first comparator 41 receives through one terminal thereof a pixel signal that is outputted from a first column of the pixel array 10. The first comparator 41 also receives through the other terminal thereof a ramp signal VRAMP that is applied from the ramp signal generation circuit 30. The first comparator 41 compares the values of the two signals with each other, and outputs a comparison signal.

The ramp signal VRAMP is a signal, the voltage level of which is reduced by a predetermined amount over time after initialization has started. Hence, the ramp signal VRAMP may start form a certain high voltage value and then may gradually be reduced. As the ramp signal VRAMP is being gradually reduced, at some time point the values of the two signals inputted to the first comparator 41 coincide with each other. When this happens, immediately after the time point when the two input values coincided, the value of the comparison signal outputted from the first comparator is inverted. The same process occurs with respect to each of the plurality of the comparators in the comparison circuit 40.

Next, a first counter 51 counts a clock that is provided from the control circuit 80 from a time point at which the ramp signal VRAMP begins to fall, to the time point at which the comparison signal outputted from the comparison device 41 is inverted, and outputs the counting information. Each counter is initialized according to a reset signal that is provided from the control circuit. The same process is performed by each of the plurality of the counters in the counting circuit 50.

Then, a first memory 61 stores the counting information outputted from the first counter 51 according to a load signal that is provided from the control circuit 80, and outputs the counting information to the column readout circuit 70. The same function is performed by each of the plurality of memories in the memory circuit 60.

In the above-mentioned analog-to-digital conversion method, the maximum time for analog-to-digital converting data is determined by a value of the data. More specifically, the data conversion time TTOTAL may be expressed by the following Equation 1.

$$T_{TOTAL}=(\Delta V_1+\Delta V_2)/\Delta V_{step}$$ [Equation 1]

Wherein, $\Delta V1$=VRAMP−VDMAX, $\Delta V2$=VDMAX−VDMIN, $\Delta V$step denotes one step when the ramp signal falls, VDMAX denotes a maximum value within a range of a total amount of data to be converted in the analog-to-digital conversion, and VDMIN denotes a minimum value within the range of the total amount of data to be converted in the analog-to-digital conversion.

However, in the above-mentioned analog-to-digital conversion method, the maximum time required for converting the data from analog-to-digital is rather substantial. Hence, the aforementioned conversion has a disadvantage in that the power consumption is increased.

To overcome this, an embodiment of the present invention is directed to an image sensor having a higher data conversion speed. For example, in an embodiment the data conversion speed may be at least two times higher than that of the aforementioned analog-to-digital conversion method. The inventive method may thus reduce power consumption, and makes it possible to operate an image sensor employing such method with substantially lower power consumption. An embodiment will be described in detail with reference to FIGS. 2A to 3B.

Figure 2A:
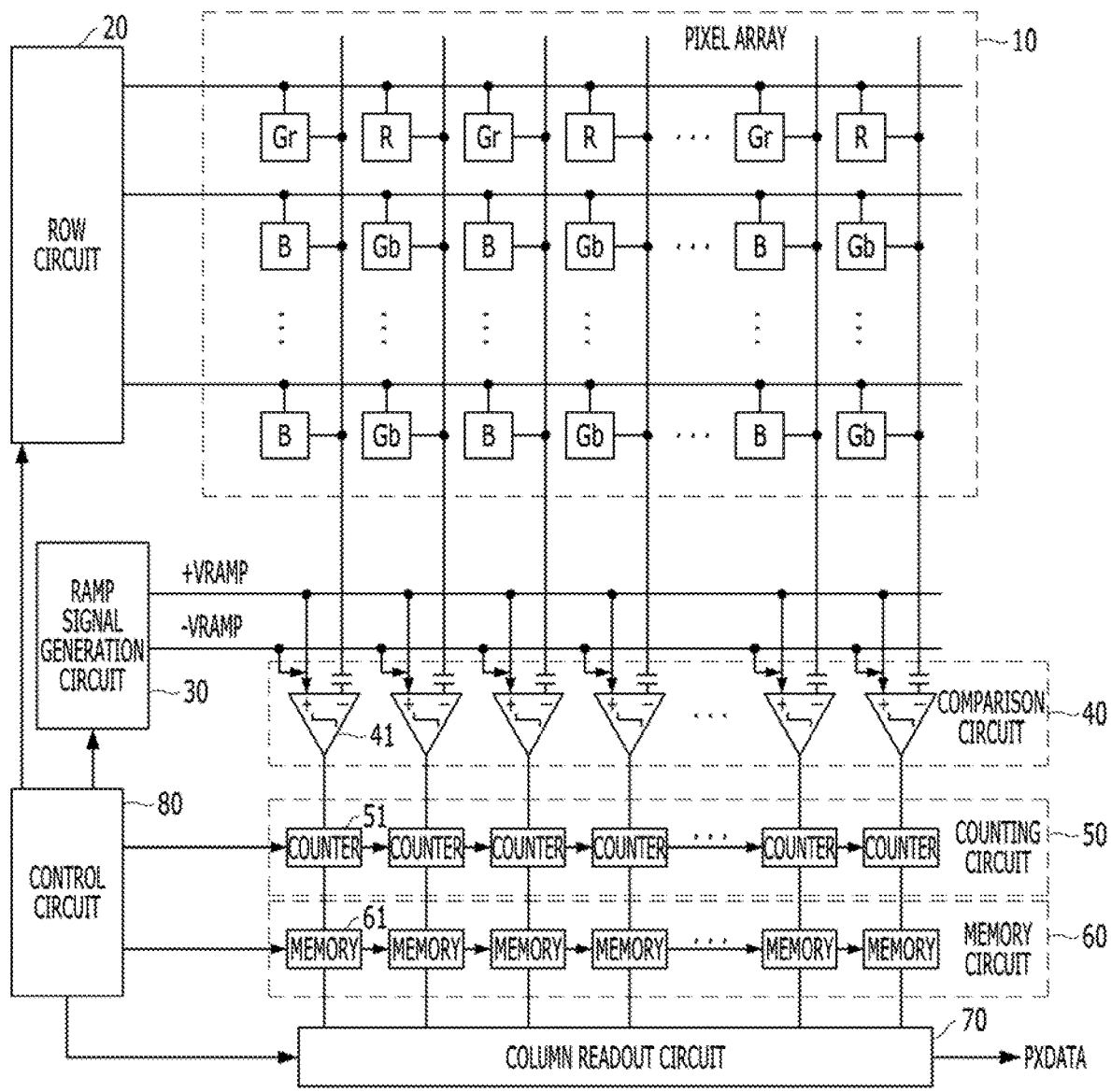
FIG. 2A is a diagram illustrating a CMOS image sensor in accordance with an embodiment of the present invention.
Figure 2B:
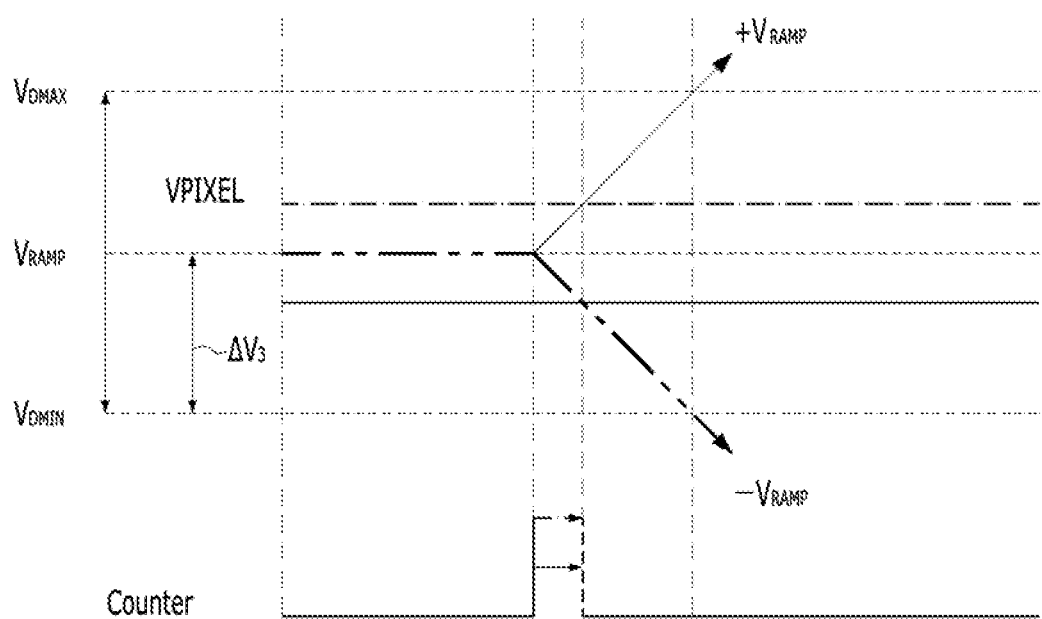
FIG. 2B is a timing diagram describing an analog-digital conversion operation of the CMOS image sensor shown in FIG. 2A.

FIG. 2A illustrates a CMOS image sensor in accordance with an embodiment of the present invention. FIG. 2B is a timing diagram describing an analog-to-digital conversion operation of the CMOS image sensor shown in FIG. 2A.

Referring to FIG. 2A, the CMOS image sensor may include a pixel array 10, a row circuit 20, a ramp signal generation circuit 30, a comparison circuit 40, a counting circuit 50, a memory circuit 60, a column readout circuit 70, and a control circuit 80.

The pixel array 10 may output pixel signals corresponding to incident light. The row circuit 20 selects pixels in the pixel array 10 by respective row lines and controls the operations of the selected pixels. For example, the row circuit 20 may include a row decoder and a row driver. The ramp signal generation circuit 30 generates a ramp-up signal +VRAMP or a ramp-down signal −VRAMP. The comparison circuit 40 selects a value of the ramp-up signal +VRAMP or the ramp-down signal −VRAMP applied from the ramp signal generation circuit 30 and compares it with a value of each pixel signal outputted from the pixel array 10. The counting circuit 50 counts a clock that is provided from the control circuit 80 according to each output signal of the comparison circuit 40. The memory circuit 60 stores counting information outputted from the counting circuit 50.

The column readout circuit 70 successively outputs data of the memory circuit 60 as pixel data PXDATA, and the control circuit 80 controls the operations of the row circuit 20, the ramp signal generation circuit 30, the counting circuit 50, the memory circuit 60, and the column readout circuit 70. For example, the control circuit 80 may include a timing generator.

The comparison circuit 40 includes a plurality of comparators 41, the counting circuit 50 includes a plurality of counters 51, and the memory circuit 60 includes a plurality of memories 61. The comparators, the counters, and the memories are provided in columns corresponding to the columns of the pixel array so that for each column corresponds a comparator 41, a counter 51 and a memory 61. Hence, a pixel signal generated by the pixel array is transmitted to a comparator, counter and memory of a respective column in the recited order. Hereinafter, the operation of one comparator, one counter, and one memory will be described by way of example.

A first comparator 41 receives through one terminal thereof a pixel signal that is outputted from a first column of the pixel array 10. The first comparator also selects any one of the ramp-up signal +VRAMP and the ramp-down signal −VRAMP that are applied from the ramp signal generation circuit 30, receives the selected ramp signal through the other terminal thereof, compares values of the two signals with each other, and outputs a comparison signal.

The ramp-up signal +VRAMP and the ramp-down signal −VRAMP have the same voltage level during an initialization whereby until a predetermined time passes after initialization has started. For example, the same voltage level of the ramp-up signal +VRAMP and the ramp-down signal −VRAMP may be set equal to (VDMAX+VDMIN)/2. After passing of the predetermined amount of time from the initialization time point, the voltage level of the ramp-up signal +VRAMP is gradually increased at a constant rate by a predetermined amount. At the same time when the ramp-up signal +VRAMP starts to increase, (i.e., at the passing of the predetermined time after initialization), the voltage level of the ramp-down signal −VRAMP is gradually reduced at a constant rate by a predetermined amount. Eventually, a time point at which the value of a selected one of the ramp-up signal +VRAMP and the ramp-down signal −VRAMP coincides with the value of the pixel signal occurs. With the passage of the coincidence time point, the value of the comparison signal outputted from the comparator is inverted. The same process is performed by each one of the plurality of the comparators in the comparison circuit 40.

Then, a first counter 51 counts the clock from the control circuit 80 from a time point at which the voltage level of the ramp signal VRAMP begins to be increased or reduced, to the time point at which the comparison signal outputted from the comparison device 41 is inverted, and outputs the counting information. The same process is performed by each of the counters in the counting circuit 50. Each counter is initialized according to a reset signal provided from the control circuit.

Then, a first memory 61 stores the counting information outputted from the counter 51 according to a load signal provided from the control circuit 80, and outputs the counting information to the column readout circuit 70.

In the above-described analog-to-digital conversion method, the maximum time for analog-to-digital converting data may be reduced substantially. More specifically, the data conversion time TTOTAL may be determined by the following Equation 2.

$$T_{TOTAL} = \Delta V_3 / \Delta V_{step} \quad \text{[Equation 2]}$$

Here, ΔV3=VRAMP−VDMAX or ΔV3=(VDMAX−VDMIN)/2 is satisfied, ΔVstep denotes one step when the ramp signal rises or falls, VDMAX denotes a maximum value within a range of a total amount of data to be converted in the analog-to-digital conversion, and VDMIN denotes a minimum value within the range of the total amount of data to be converted in the analog-to-digital conversion.

Figure 3A:
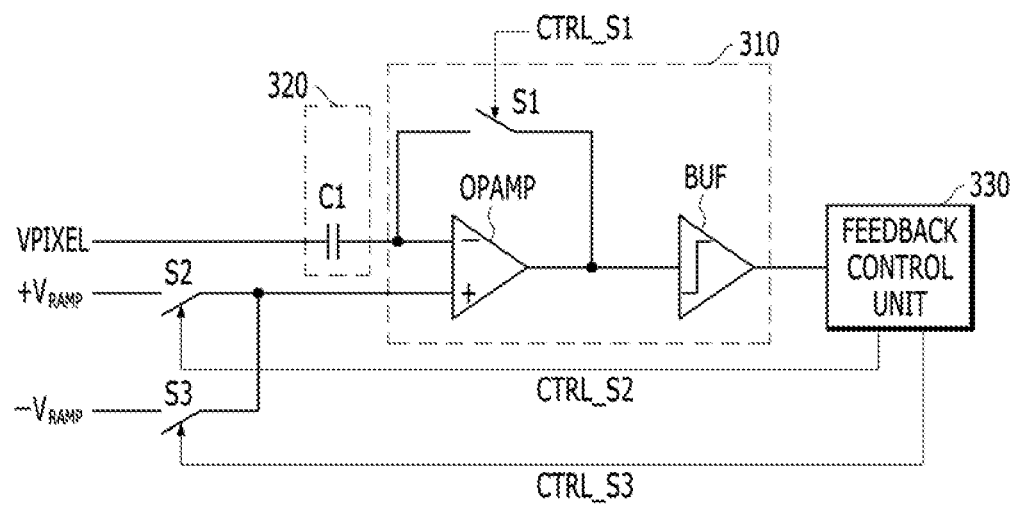
FIG. 3A is a diagram illustrating a comparator in accordance with an embodiment of the present invention.
Figure 3B:
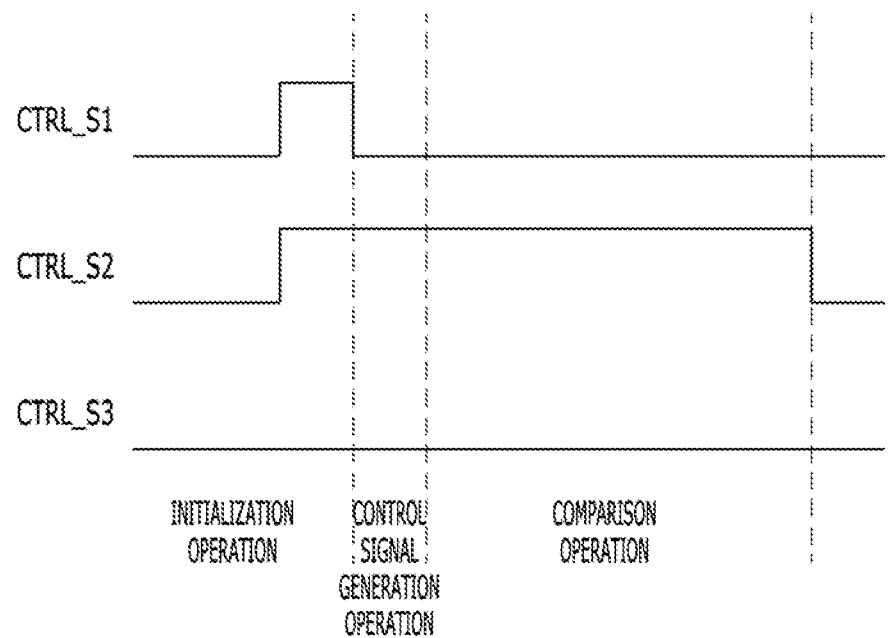
FIGS. 3B and 3C are diagrams showing control signal timings of the comparator shown in FIG. 3A.
Figure 3C:
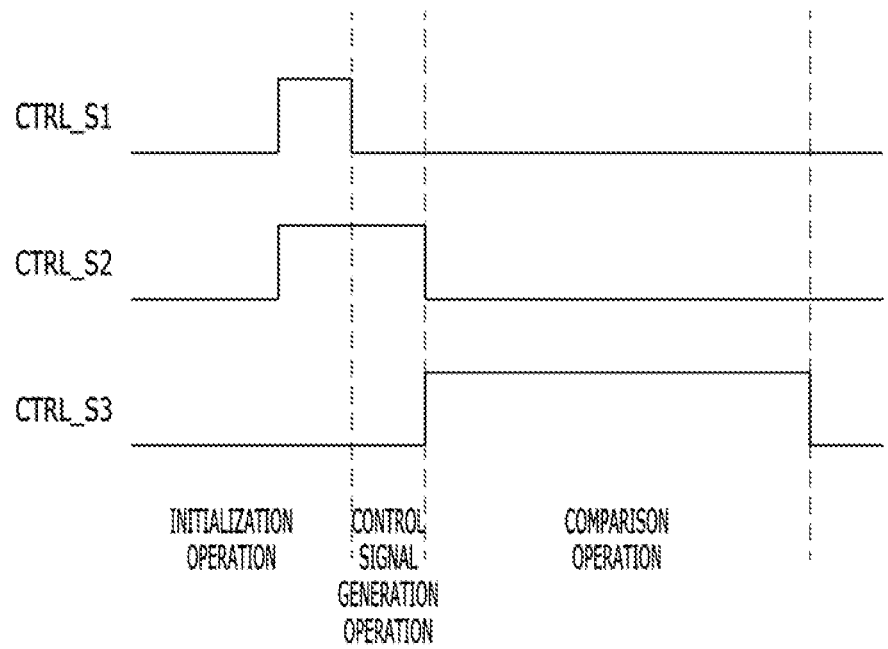
Figure 3D:
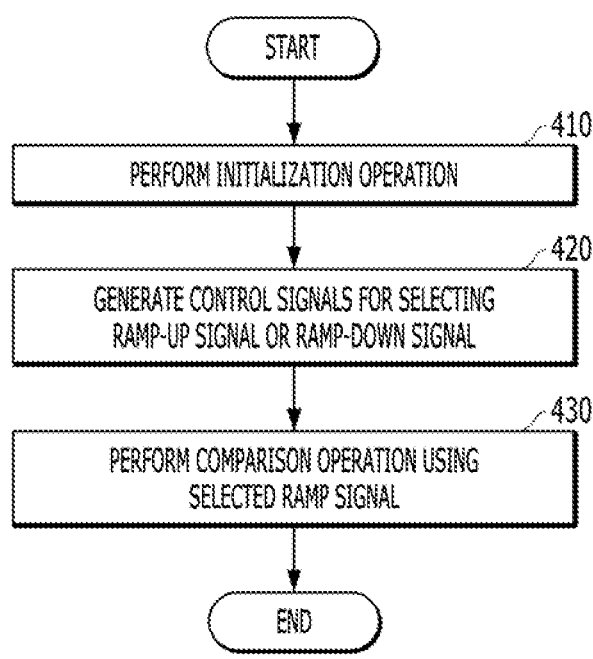
FIG. 3D is a flowchart showing a method of operating the comparator shown in FIG. 3A.

FIG. 3A is a diagram illustrating a comparator in accordance with an embodiment of the present invention. FIGS. 3B and 3C are diagrams showing control signal timings of the comparator shown in FIG. 3A. FIG. 3D is a flowchart showing a method of operating the comparator shown in FIG. 3A. FIG. 3B illustrates a control signal timing when a voltage level of a pixel signal is greater than a reference voltage (i.e., a voltage level of a ramp signal applied until a predetermined time passes after initialization has started), and FIG. 3c illustrates a control signal timing when the voltage level of the pixel signal is equal to or less than the reference voltage.

Referring to FIG. 3A, the comparator may include a comparison block 310, a CDS block 320, a second switch S2, a third switch S3, and a feedback control unit 330.

The comparison block 310 compares any one selected signal of the ramp-up signal +VRAMP and the ramp-down signal −VRAMP with the pixel signal VPIXEL (i.e., a pixel signal). The CDS block 320 is provided between a first input terminal to which the pixel signal VPIXEL is inputted and a negative input terminal (−) of the comparison block 310, and is configured to perform CDS. The CDS block 320 may include a first capacitor C1. The CDS block 320 may further include a second capacitor and a switch. The second switch S2 is provided between a second input terminal to which the ramp-up signal +VRAMP is inputted and a positive input terminal (+) of the comparison block 310. The third switch S3 is provided between a third input terminal into which the ramp-down signal −VRAMP is inputted and the positive input terminal (+) of the comparison block 310. The feedback control unit 330 activates a second switch control signal CTRL_S2 or a third switch control signal CTRL_S3 for controlling the second and third switches S2 and S3, respectively, according to a comparison signal outputted from the comparison block 310. The third switch control signal CTRL_S3 may be a complementary signal (or an inverted signal) of the second switch control signal CTRL_S2.

In this regard, the comparator shown in FIG. 3A selects the ramp-up signal +VRAMP or the ramp-down signal −VRAMP according to the switch control signals after initialization, and performs a comparison operation. That is, the comparator compares the pixel signal to the reference voltage during the initialization. If the voltage level of the pixel signal VPIXEL is greater than the reference voltage, the comparator activates the second switch control signal CTRL_S2, selects the ramp-up signal +VRAMP, and then performs the comparison operation after the initialization. If the voltage level of the pixel signal VPIXEL is equal to or less than the reference voltage during the initialization, the comparator activates the third switch control signal CTRL_S3, selects the ramp-down signal −VRAMP, and then performs the comparison operation after the initialization.

For example, the comparison block 310 may include an operational amplifier OPAMP, a first switch (i.e., a feedback switch) S1 and a buffer BUF, or include the comparator and the first switch S1. The CDS block 320 may include a first capacitor C1 as illustrated in FIG. 3A.

Hereinafter, an operation process of the comparator will be descried with reference to FIGS. 3A to 3D.

The overall operation of the comparator is implemented in a sequence of an initialization operation (i.e., an offset canceling operation), a control signal generation operation, and a comparison operation (i.e., a pixel signal comparison operation).

The comparator performs the initialization operation at step 410. The initialization operation includes the comparator comparing the pixel signal VPIXEL to the reference voltage (i.e., a voltage level of a ramp signal applied until a predetermined time passes after initialization has started) and outputs a comparison signal. In more detail, the first and second switches S1 and S2 are turned on, and the third switch S3 is turned off. A value of the pixel signal VPIXEL inputted from the first input terminal is stored in the first capacitor C1. As the second switch S2 is turned on, the ramp-up signal +VRAMP is inputted to the positive input terminal (+) of the comparison block 310 through the second input terminal. Then, the comparison block 310 compares the pixel signal VPIXEL to the reference voltage and outputs a comparison signal to the feedback control unit 330.

Thereafter, the comparator generates switch control signals for selecting the ramp-up signal +VRAMP or the ramp-down signal −VRAMP at step 420. That is, as the result of comparison between the pixel signal VPIXEL and the reference voltage, if the voltage level of the pixel signal VPIXEL is greater than the reference voltage, the comparator activates the second switch control signal CTRL_S2, and if the voltage level of the pixel signal VPIXEL is equal to or less than the reference voltage, the comparator activates the third switch control signal CTRL_S3. In more detail, the first switch S1 is turned off (i.e., a first switch control signal CTRL_S1 is deactivated). As the result of comparison between the pixel signal (i.e., pixel output voltage) and the level of the reference voltage while the second switch S2 is turned on and the third switch S3 is turned off, if the voltage level of the pixel signal VPIXEL is greater than the reference voltage, the feedback control unit 330 activates the second switch control signal CTRL_S2, and if the voltage level of the pixel signal VPIXEL is equal to or less than the reference voltage, the feedback control unit 330 activates the third switch control signal CTRL_S3. In this case, the counter and the memory acquire and store data of a most significant bit (MSB).

Thereafter, the comparator performs a comparison operation using the selected the ramp signal (i.e., the ramp-up signal +VRAMP or the ramp-down signal −VRAMP) at step 430. That is, the comparator selects the ramp-up signal +VRAMP according to the activated second switch control signal CTRL_S2 and performs the comparison operation, or selects the ramp-down signal −VRAMP according to the activated third switch control signal CTRL_S3 and performs the comparison operation. In more detail, the first switch S1 is in an off state. When the second switch control signal CTRL_S2 is activated, the ramp-up signal +VRAMP is inputted to the positive input terminal (+) of the comparison block 310 through the second input terminal while the second switch S2 is turned on and the third switch S3 is turned off. Then, the comparison block 310 compares the pixel signal VPIXEL with the ramp-up signal +VRAMP and outputs a comparison signal to the feedback control unit 330. When the third switch control signal CTRL_S3 is activated, the second switch S2 is turned off and the third switch S3 is turned on, whereby the ramp-down signal −VRAMP is inputted to the positive input terminal (+) of the comparison block 310 through the third input terminal. Then, the comparison block 310 compares the pixel signal VPIXEL with the ramp-up signal +VRAMP and outputs a comparison signal to the feedback control unit 330. In this case, the counter and the memory perform the data conversion operation by up-counting in the case where the ramp-up signal +VRAMP is selected, or performs the data conversion operation by down-counting in the case where the ramp-down signal −VRAMP is selected, and then stores the data.

Various embodiments provide an image sensor having a high-speed data conversion speed which may be two or more times as high as that of the conventional technology, thereby reducing power consumption, and making it possible to operate the image sensor with low power.

Although various embodiments have been described for illustrative purposes, it will be apparent to those skilled in the art that various changes and modifications may be made without departing from the spirit and scope of the invention as defined in the following claims.

What is claimed is:

1. A comparator for an image sensor, the comparator comprising:
    a signal comparison circuit configured to compare a pixel signal with a ramp signal including a ramp-up signal and a ramp-down signal;
    a correlated double sampling (CDS) block configured to perform a correlated double sampling operation on the pixel signal;
    a first signal providing circuit configured to provide the ramp-up signal as the ramp signal based on a first control signal;
    a second signal providing circuit configured to provide the ramp-down signal as the ramp signal based on a second control signal; and
    a feedback control circuit configured to generate the first and second control signals after an initialization operation, based on a result of the comparison performed during the initialization operation,
    wherein the ramp-up signal and the ramp-down signal include a reference voltage during the initialization operation.

2. The comparator of claim 1, wherein the feedback control circuit activates the first control signal when a voltage level of the pixel signal is greater than the reference voltage during the initialization operation whereby until a predetermined time passes after starting the initialization operation.

3. The comparator of claim 1, wherein the feedback control circuit activates the second control signal when a voltage level of the pixel signal is equal to or less than the reference voltage during the initialization operation whereby until a predetermined time passes after starting the initialization operation.

4. The comparator of claim 1, wherein the signal comparison circuit includes an operational amplifier and a feedback switch.

5. The comparator of claim 4, the signal comparison circuit further includes a buffer.

6. The comparator of claim 1, wherein the CDS block includes a capacitor.

7. An operating method of an image sensor, the operating method comprising:
    comparing a pixel signal to a reference voltage of a ramp-up signal and a ramp-down signal during an initialization operation;
    selecting the ramp-up signal or the ramp-down signal after the initialization operation, based on a result of the comparison during the initialization operation; and
    comparing the pixel signal to the selected ramp-up signal or the ramp-down signal to perform a comparison operation.

8. The operating method of claim 7, wherein the ramp-up signal is selected during the comparison operation when a voltage level of the pixel signal is greater than the reference voltage during the initialization operation, and the ramp-down signal is selected during the comparison operation when a voltage level of the pixel signal is equal to or less than the reference voltage during the initialization operation.

9. An image sensor comprising:
    a pixel array configured to output a pixel signal corresponding to incident light;
    a ramp signal generation circuit configured to generate a ramp signal including a ramp-up signal and a ramp-down signal;
    a comparison circuit configured to select the ramp-up signal or the ramp-down signal after an initialization operation, based on a value of the pixel signal outputted during the initialization operation, to compare a value of the pixel signal with a value of the selected ramp signal among the ramp-up signal or the ramp-down signal and to generate an output comparison signal;
    a counting circuit configured to perform a counting operation on the output comparison signal;
    a memory circuit configured to store data representative of the counting information outputted from the counting circuit;
    a column readout circuit configured to output the data of the memory circuit; and
    a control circuit configured to control operations of pixel array, the ramp signal generation circuit, the comparison circuit, the counting circuit, the memory circuit and the column readout circuit.

10. The image sensor of claim 9, wherein a comparator provided in each column of the comparison circuit, comprises:
    a signal comparison circuit configured to compare the pixel signal with a reference voltage of the ramp signal during the initialization operation and to compare the pixel signal with the ramp-up signal or the ramp-down signal after the initialization operation;
    a correlated double sampling (CDS) circuit configured to perform a correlated double sampling operation on the pixel signal; and
    a ramp signal providing circuit configured to provide the ramp-up signal or the ramp-down signal after the initialization operation, based on a result of the comparison performed during the initialization operation.

11. The image sensor of claim 10, wherein the ramp signal providing circuit provides the ramp-up signal when a voltage level of the pixel signal is greater than a voltage level of the reference voltage during the initialization operation whereby until a predetermined time passes after starting the initialization operation.

12. The image sensor of claim 10, wherein the ramp signal providing circuit provides the ramp-down signal when a voltage level of the pixel signal is equal to or less than a voltage level of the reference voltage during the initialization operation whereby until a predetermined time passes after starting of the initialization operation.

13. The image sensor of claim 10, wherein the signal comparison circuit includes an operational amplifier and a feedback switch.

14. The image sensor of claim 13, the signal comparison circuit further includes a buffer.

15. The image sensor of claim 10, wherein the CDS block includes a capacitor.

16. The image sensor of claim 9, wherein the image sensor is a CMOS image sensor.

17. The image sensor of claim 9, further comprising a row circuit.

18. The comparator of claim 1, wherein the voltage level of the ramp-up signal is gradually increased and the voltage level of the ramp-down signal is gradually decreased after the initialization operation.

19. The operating method of claim 7, wherein the voltage level of the ramp-up signal is gradually increased and the voltage level of the ramp-down signal is gradually decreased after the initialization operation.

20. The image sensor of claim 9, wherein the voltage level of the ramp-up signal is gradually increased and the voltage level of the ramp-down signal is gradually decreased after the initialization operation.

21. The image sensor of claim 10, wherein the ramp signal providing circuit, comprising:
   a feedback control circuit configured to generate first and second control signals;
   a first signal providing circuit configured to selectively provide the ramp-up signal as the ramp signal based on the first control signal; and
   a second signal providing circuit configured to selectively provide the ramp-down signal as the ramp signal based on the second control signal,
   wherein the first control signal is activated when the voltage level of the pixel signal is greater than the reference voltage,
   wherein the second control signal is activated when the voltage level of the pixel signal is equal to or less than the reference voltage.

* * * * *